R. E. ROSEBERRY.
PORTABLE MACHINE FOR REBORING ENGINE CYLINDERS.
APPLICATION FILED DEC. 14, 1916.
1,267,806.
Patented May 28, 1918.
3 SHEETS—SHEET 2.
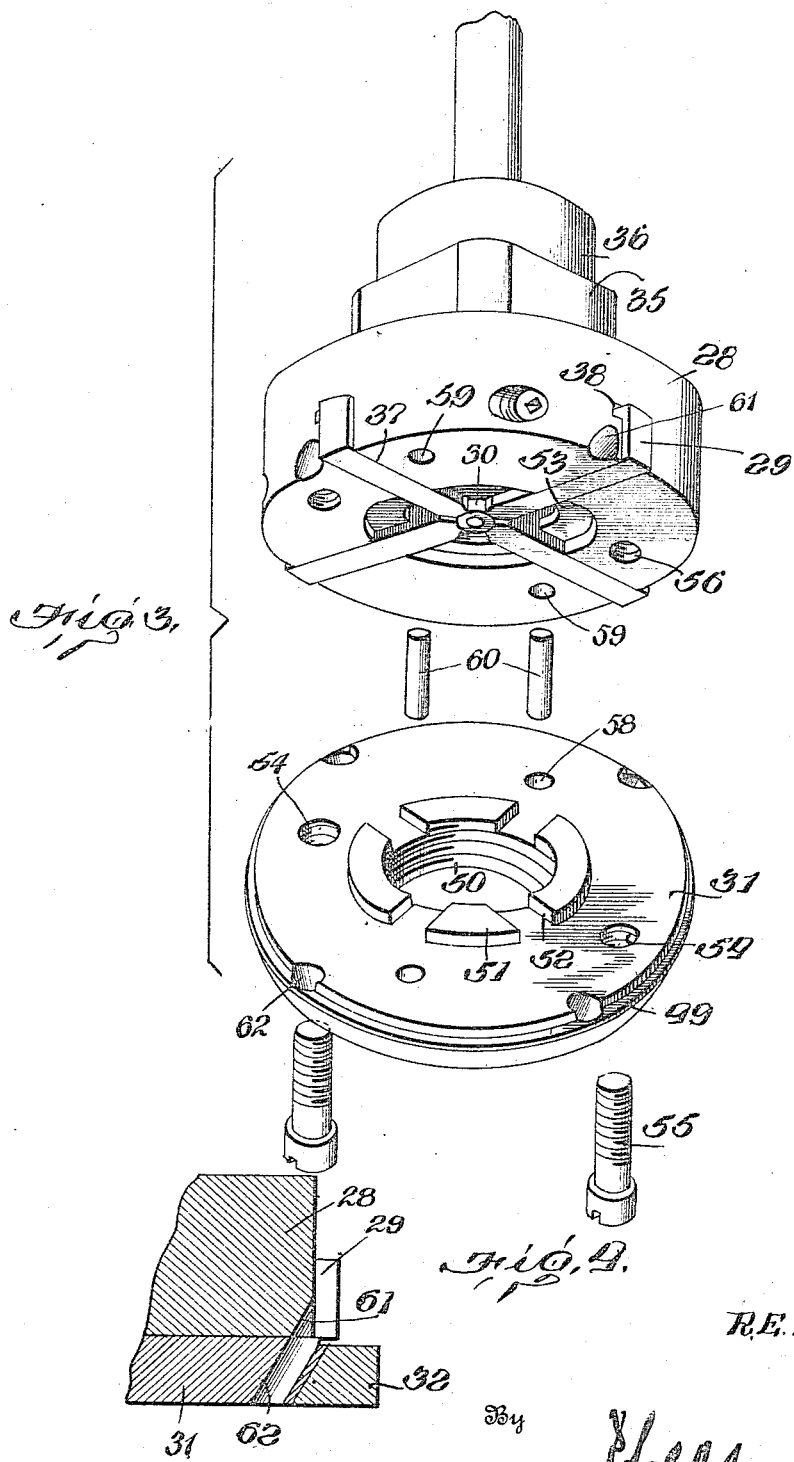

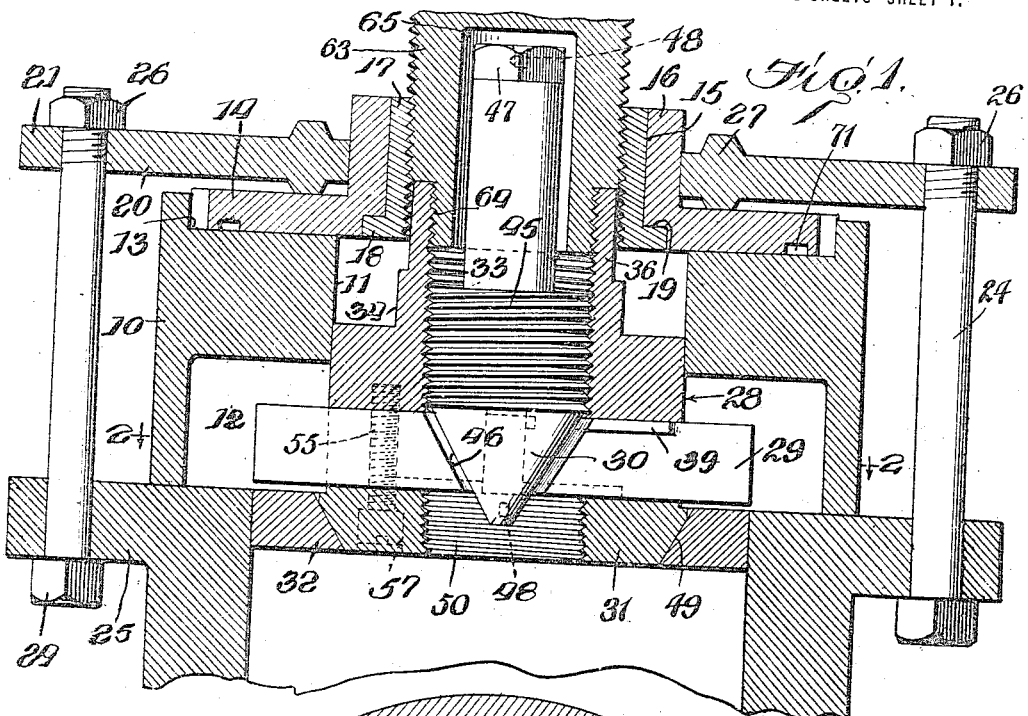
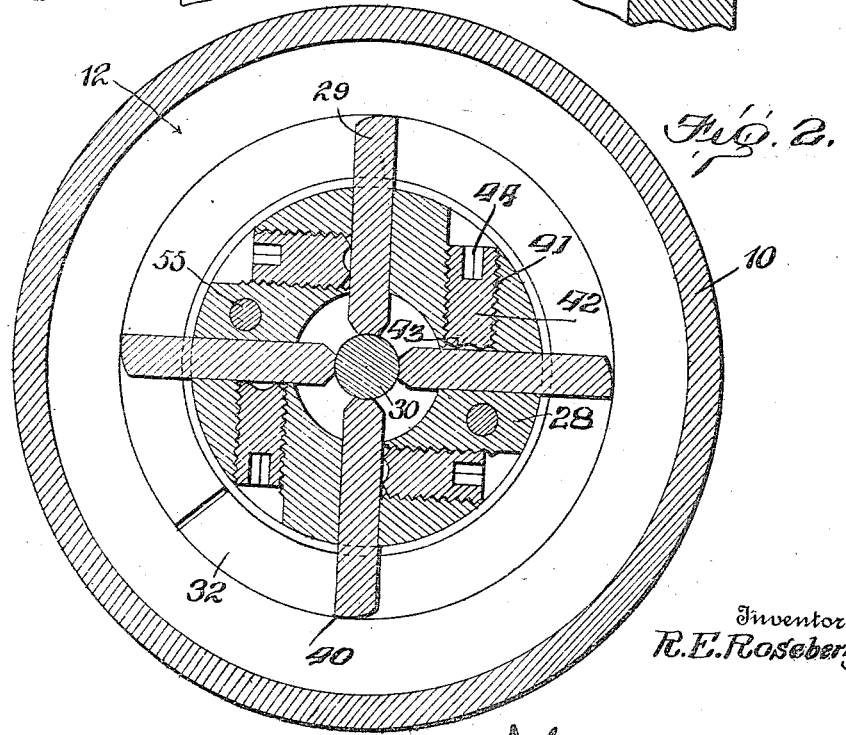

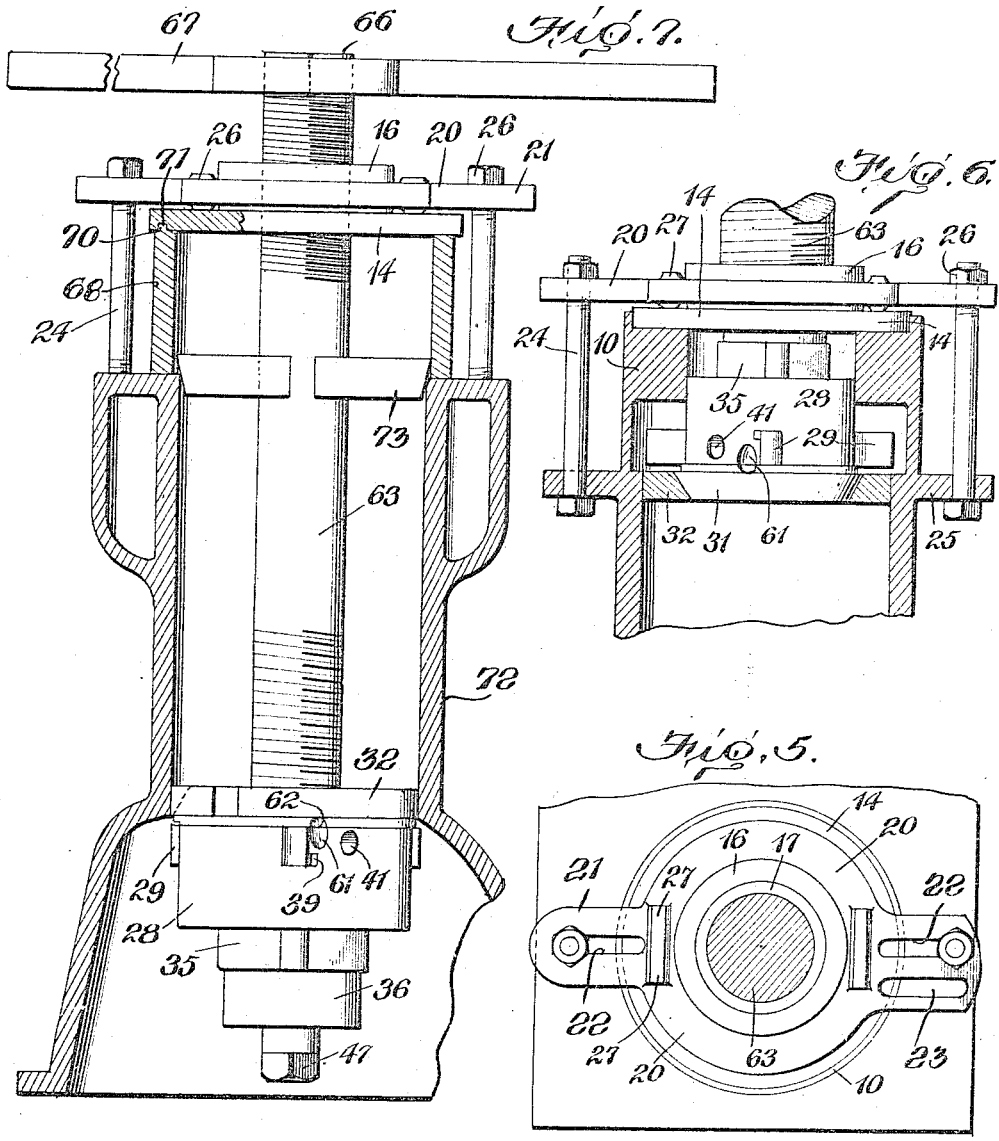

UNITED STATES PATENT OFFICE.

ROBERT E. ROSEBERRY, OF BALTIMORE, MARYLAND, ASSIGNOR TO UNIVERSAL TOOL COMPANY, OF DETROIT, MICHIGAN, A CORPORATION.

PORTABLE MACHINE FOR REBORING ENGINE-CYLINDERS.

1,267,806. Specification of Letters Patent. Patented May 28, 1918.

Application filed December 14, 1916. Serial No. 137,018.

*To all whom it may concern:*

Be it known that I, ROBERT E. ROSEBERRY, a citizen of the United States, residing at Baltimore, in the State of Maryland, have invented certain new and useful Improvements in Portable Machines for Reboring Engine-Cylinders, of which the following is a specification.

My present invention relates to new and useful improvements in portable machines for reboring engine cylinders and more particularly to that type of machines disclosed in a copending application filed by me April 26, 1916, and patented January 2, 1917, No. 1,210,843, the primary object of my invention being the adaptation of the reboring machine there shown in order to enable it to perform certain operations which it could not previously perform, while still leaving it capable of performing all operations and work for which it was previously adapted.

More specifically, my improved engine cylinder reboring machine includes a centering device adapted to be clamped to the engine, the cylinders of which are to be rebored, a cutter mechanism and a feed screw carrying the cutter mechanism and threaded through the centering device. One of the primary objects of my invention consists in so arranging the cutter mechanism that it may be reversibly applied to the feed screw so that the cutting operation may be performed by pushing the cutter mechanism through the cylinder from one end to the other or, if both ends of the cylinder are open and accessible, by drawing the cutter mechanism through the cylinder from one end to the other.

In this connection, a still further object of my invention consists in providing a novel means for centering the mechanism when the reboring is being accomplished by drawing the cutter head through the cylinder.

Again my improved cylinder reboring machine includes a cutter head carrying radial cutter blades and also carrying a beveled head which in turn carries a centering ring by means of which the cutter head is properly centered in the cylinder during the entire cutting operation.

In this connection, another object of my invention consists in the provision of a novel means for centering and securing the beveled head to the cutter head, the means being such that the cutter head may be rotated through direct connection with the feed screw or through a direct connection between the feed screw and the beveled head.

Another object which I have in mind is the arrangement and proportioning of the parts in such a manner that the cutters may be readily adjusted with respect to the head.

With many types of engine casings, the bores of the cylinders are surrounded at their ends by flanges and for this reason another object of my invention resides in so constructing the centering and clamping mechanism, the feed screw and the cutter head that the cutter head may be raised to have considerable clearance above the ends of the cylinder, if necessary.

The centering mechanism proper of my machine is secured to the engine casing by means of a clamp plate and certain clamp bolts and nuts and another object of my invention resides in the provision of an improved form of clamp plate which will insure a more even and steady locking together of the parts.

With these and other objects in view, my invention will be more fully described, illustrated in the accompanying drawings, and then specifically pointed out in the claims which are attached to and form a part of this application.

In the drawings:

Figure 1 is an enlarged vertical and central sectional view of my machine in use;

Fig. 2 is a transverse sectional view taken on the line 2—2 of Fig. 1, looking in the direction of the arrows;

Fig. 3 is a perspective view of the cutter head as a whole, showing the parts in unassembled position;

Fig. 4 is a fragmentary sectional view, showing the means by which the shavings escape;

Fig. 5 is a top plan view, showing the manner of securing the machine to the cylinder to be bored;

Fig. 6 is a fragmentary elevational view, partially in section, showing my improved machine in use with the cutter head applied to the feed screw in position to be forced through the cylinder;

Fig. 7 is a corresponding view showing the cutter head reversed upon the feed screw in position to be drawn through the cylinder.

Corresponding and like parts are referred to in the following description and indicated in all the views of the drawings by the same reference characters.

My machine primarily includes a supporting and centering mechanism and a cutter mechanism. The supporting mechanism includes a main supporting ring 10, of steel or other suitable material, of an external diameter greater than the diameter of the bore of any cylinder with which the machine is to be employed. This ring is formed with a central bore or passage 11 equal in diameter to the external diameter of the cutter head, as will be later apparent, and at its lower end is counterbored or recessed to provide an annular chamber 12 which will at least equal in diameter the diameter of the bore of the engine cylinder. At its upper end, the main ring 10 is correspondingly recessed to provide an annular seat 13 for the feed plate or disk 14. This disk is of such thickness as to project slightly above the ring when engaged in the seat 13 and is formed centrally with a bore 15 surrounded by an upstanding annular flange 16. An internally threaded bushing or nut 17 fits about the bore 15 and flange 16 and at its lower end is formed with an annular shoulder 18 engaging in a suitably formed seat 19 in the lower face of the disk 14.

A clamping plate 20 is formed centrally with an opening to snugly receive the flange 16 in order that the plate may rest upon the feed disk 14 and this plate, as best shown in Fig. 5, is provided with diametrically extending ears 21 formed with alined slots 22. One of the ears is further provided with an offset slot 23 extending parallel to its slot 22. When the machine is in use, bolts 24 are passed through bolt receiving openings in the cylinder flanges 25 and through the slots of the clamping plate and secured by nuts 26. By the provision of two slots in one of the ears, it is possible to always clamp the main supporting ring 10 against the end of the cylinder in such a manner that it is concentrically disposed with respect to the cylinder bore. The clamping plate, at either side of its bore and upon both its upper and lower faces, in order that it may be reversible, is provided with transverse parallel ribs 27 adapted to engage the feed plate or disk 14 and insure an even and firm pressure thereagainst.

The cutter mechanism of my machine consists primarily of a cutter head proper 28 in which are secured cutters 29, an expander 30 for centering the cutters, a beveled head 31, and an expanding guide ring 32. The cutter head proper 28 is cylindrical in shape and is formed centrally and throughout its height with a threaded bore 33 and about the upper end of the bore with an annular collar or shoulder 34 internally threaded to form a continuation of the bore and externally formed with plane faces 35. Extending above this collar is a cylindrical sleeve 36 which is also internally threaded to form a continuation of the bore of the cutter and collar. The lower end of the cutter head proper 28 is formed with radial slots 37 extending at right angles to each other to receive the cutters 29. These slots open at their inner ends into the bore of the cutter head and also open through the bottom of the cutter head. Each slot along its upper edge is formed with a lateral extension or keyway 38 to receive the longitudinal fin or shoulder 39 formed upon the side of the cutter and terminating short of its cutting end, as shown in Fig. 1. By means of these fins the cutters, when mounted in the slots or seats, are held against all but radial movement. The outer end of each cutter is formed with a cutting edge 40 which is its forward edge with respect to the direction of rotation of the cutter head and is beveled or rounded rearwardly from such edge, as shown in Fig. 2, to suitably clear the freshly cut surface of the cylinder bore.

Tapped bores 41 are formed horizontally through the cutter head communicating with the slots and at right angles to the cutters to receive set screws 42 by which the cutters are anchored against radial movement. The inner ends of the set screws 42 are beveled and centrally concave to form annular cutting edges 43 in order that they may more firmly engage the cutters and the outer ends are formed with angular sockets 44 to receive a wrench.

The expander 30 includes a cylindrical externally threaded body 45 for threaded engagement within the bore 33 of the cutter head and terminating at one end in a conical expander head portion adapted to engage the inner ends of the cutters which are beveled, as shown at 46, for this purpose. The expander 30, at its upper end, is provided with a relatively long shank having an angularly formed terminal 47 by means of which it may be turned to force the cutters outwardly to a greater or less extent. The free end of the conical portion and the free end of the shank are formed centrally with mandrel receiving sockets 48, as shown in Fig. 1.

Co-acting with the cutter head proper, above described, is the beveled head 31. This is in the form of a disk having its peripheral edge beveled, as shown as 49, to incline downwardly and inwardly. The disk is further provided with a threaded bore 50 forming a continuation of the bore 33 of the cutter head and surrounding this bore with an annular centering collar 51 radially cut-away at intervals, as shown at 52, to snugly receive the cutters 29 when the beveled head is applied to the cutter head, the uncutaway portions of the centering ring or collar 51 seating in an annular recess 53 formed centrally of the lower face of the cutter head. It will, therefore, be apparent that this centering ring or shoulder seating in the recess of the cutter head serves to absolutely center the cutter head and beveled head with respect to each other, while the cutters seating in the slots of the centering shoulder serve to lock the two heads against independent turning movement. The beveled head is provided with a pair of diametrically disposed bores 54 to receive clamping bolts 55 which pass through them and have threaded engagement in correspondingly formed tapped bores 56 of the cutter head, the lower ends of the bores of the beveled head being counterbored to form sockets 57 to seat the slotted heads of the bolts 55 so that they will not project below the lower surface of the beveled head. The beveled head is further provided at diametrically opposite points with pin receiving bores 58 which aline with corresponding bores or sockets 59 in the cutter head in order that pins 60 may be applied to additionally secure the cutter head and beveled head against independent turning movement, under certain circumstances, as will be later pointed out.

The cutter head, in advance of each cutter, has its lower edge notched, as shown at 61 in Fig. 4, to communicate with a diametrically formed passage 62 in the beveled head and provided for the escape of shavings. The expanding guide ring 32, previously mentioned, is substantially equal in thickness to the beveled head 30, is cylindrical in shape to fit within the bore of a cylinder, and has its inner face beveled to engage against the beveled face 49 of the beveled head 31. This expanding ring is split in order that it may expand under pressure exerted against it by the beveled head 31 to engage snugly within the cylinder bore.

As a means for simultaneously rotating and advancing the cutter head, I provide a thread bar or feed screw 63 which threads through the bushing or nut 17 and which has a reduced threaded terminal 64 engaging within the collar or sleeve 36 of the cutter head. This end of the feed screw is formed centrally with a socket 65 to receive the shank of the expander 30 and the opposite end of the feed screw is reduced and formed with angularly disposed faces 66 to receive a suitable type of double handed wrench 67 or other device for imparting turning movement to the feed screw.

In employing the above described machine for reboring an engine cylinder which is accessible only from one end, cutter blades are positioned within the cutter head and the expander 30 is turned to extend the cutters so that the cutting edges of diametric cutters are spaced a distance equal to the desired bore of the cylinder when the cutters are secured by the set screws 42. This setting of the cutters may be properly gaged by the employment of vernier calipers. A beveled head of suitable size is then secured to the cutter head and an expanding guide ring 70 of proper internal diameter to coöperate with the beveled head employed and of such external diameter as to fit snugly within the bore of the cylinder when in unexpanded position is applied to the beveled head. The parts so assembled are then applied to the cylinder, as shown in Fig. 1, and the supporting ring 10 positioned above the cutter mechanism. The feed screw 63 is then applied to the cutter head and the feed plate 14 threaded downwardly upon the screw to engage in the seat 13. The clamping plate 20 is then applied and secured by the bolts 24 and nuts 26. The cylinder may now be rebored by a continuous and uniform turning of the feed screw 63 to simultaneously rotate and advance the cutter head, the expanding guide ring 32, together with the supporting ring 10, serving to properly centralize and guide the cutter head as the cutters are being brought into engagement with the wall of the cylinder. This movement, of course, forces the expanding ring 32 downwardly and its engagement by the beveled head 31 causes it to expand and fit snugly within the cylinder to guide the cutter head and centralize it throughout the entire reboring operation. The engagement of the ribs or shoulders of the clamping plate 20 with the feed plate and the fact that the clamping plate engages the feed plate and not the supporting ring 10 insures a maintaining of the supporting ring 10 and nut 17 in absolute axial alinement with the cylinder bore and a consequent true boring of the cylinder.

At this point it should be noted that the sleeve portion 36 of the cutter head is movable into the threaded bore of the nut 17 and that the height of this sleeve and of the collar 35 is so proportioned with respect to the space between the cylinder and clamping plate 14 that the cutters may be raised considerably above the end of the cylinder and into the upper portion of the chamber 12, if necessary, because of any flanges or abutments surrounding the ends of the cylinder bore.

The above employment of my reboring machine applies to cylinders in which the bore is enlarged at the cylinder head to provide a combustion chamber as with such a cylinder the cylinder may be rebored throughout its entire length at a single operation, the ring 32 and beveled head 31 seating in the enlarged explosion chamber while the cutters are operating upon the extreme end of the cylinder bore. There are, however, many cylinders in which the entire bore of the cylinder is uniform throughout its length. When reboring such a cylinder, with my machine, the cylinder is bored in the manner described until the beveled head engages the cylinder head. The boring machine is then removed from the cylinder and its expanding guide ring and beveled head removed, after which the machine is remounted upon the cylinder and the cutter head lowered into the cylinder bore to the point where the previous reboring had stopped. The feed screw is then further rotated to finish the boring of the cylinder until the cutters engage directly against the cylinder head. Because of the extreme accuracy with which my boring machine is centralized and the firmness with which it is supported, it is possible to resume the boring operation with exactness and without any danger of leaving a fin or ridge in the surface of the bore. This is a great advantage as sometimes it is necessary, after the boring operation has commenced, to remove the machine in order that a dulled or broken cutter may be repaired or replaced.

The housings or bodies of the cylinders of some engines, for instance Ford engines, are so small that the use of a supporting ring of the size best adapted for employment in reboring other engine cylinders is impossible. For this reason I provide a modified form of supporting ring, best shown in Fig. 7 of the drawings. This ring includes a body 68 corresponding to the ring 10 and of slightly larger internal diameter than the cutter head. The external diameter of this body is, however, but slightly greater than the bore of a Ford engine cylinder in order that the bolts 24, when passed through the flange of such cylinder, may just clear the ring. The upper end of the ring is counterbored to provide an annular shoulder 70 adapted to seat in an annular channel 71 formed in the lower face of the feed plate 14.

Many internal combustion engines as now constructed, among them being the Ford engine, are so formed that the bores of the cylinders are accessible from either end. With cylinders of such a type, I prefer to employ my machine in a somewhat different manner as better results may thereby be attained. In Fig. 7, I have illustrated the employment of my machine in this new manner in connection with a cylinder, indicated by the numeral 72. As there shown, a split resilient centering ring 73, having its outer face beveled, is inserted in the head end of the cylinder and in the adjacent end of the main centering ring 68 to insure proper centering of the ring 68 with respect to the bore of the cylinder and a left hand feed screw is threaded through the feed plate or nut until its end projects through the opposite end of the cylinder bore. The cutter head and beveled head are then applied to the feed screw in a position reverse to that shown in Fig. 1, the reduced end of the feed screw being threaded into the beveled head until its shoulder engages the outer face of the head, a proper expanding guide ring 32 being, of course, employed upon the beveled head. The feed screw is then turned in the same direction as usual to draw the cutter head upwardly through the cylinder bore until the cylinder has been rebored throughout its entire length. Obviously, as the cutter head will be turned in a reverse direction, another set of cutters are employed having their reversed edges sharpened. As the guide ring 32 engages the centering ring 73 it gradually forces it upward out of the cylinder bore until both the centering ring 73 and expanding guide ring, as well as the beveled head, seat in the main centering ring 68. By providing this ring, it is possible to operate the device to bring the cutters completely through the end of the cylinder. Obviously, when employing the machine in this manner, the power is transmitted from the feed screw to the cutter head indirectly through the beveled head and to absolutely insure sufficient strength and connection between the heads, the pins 60, previously described, are employed. When the machine is being used in other ways, these pins are not necessary, as the bolts, together with the engagement between the centering collar 51 and cutters, are sufficient to lock the beveled head to turn with the cutter head as there is no resistance to such turning except the friction between the expanding guide ring and cylinder.

Inasmuch as the crank shaft end of the cylinder receives no piston wear, it will be clear that absolute proper centralizing of the cutter mechanism is possible when reboring the cylinders by the last described method and it is, therefore, possible to perform a much more accurate operation.

It will of course be apparent that my cylinder reboring machine may be operated by hand or machine power or may be placed in a drill press and driven by the press.

Because of the handle receiving sockets 48 in the free end of the conical portion and free end of the shank of the expander, it is possible to mount this expander, together with the cutter head and its blades, upon the mandrel of a grinding machine so that the entire cutter head and blades may be revolved and all the blades sharpened at once and uniformly. Preferably, the inner ends of the cutters are doubly beveled, as best shown in Fig. 2, in order that such ends may come close together when the cutters are drawn in for small cylinder work without striking against each other.

It will of course be understood that although I have illustrated and described my invention in all its details, various changes, within the scope of the appended claims, may be made without in the slightest degree departing from the spirit of my invention.

Having thus described the invention, what is claimed as new is:

1. In an engine cylinder reboring machine, a cutter head, cutters adjustably mounted in slots formed in one face of the cutter head, the cutter head being formed with a central annular recess across which the inner ends of the cutters project, a beveled head formed with a notched annular shoulder to engage in the recess with the cutters seating in the notches thereof, and securing means between the beveled head and cutter head.

2. In a machine for reboring engine cylinders, a cutter head, cutters mounted in slots formed in one face of the head, a beveled head, shoulder and recess centering means between the heads, fastening means between the heads, and an expanding guide ring engaging the beveled head.

3. In a machine for reboring engine cylinders, a supporting ring, a feed plate supported by the ring, a clamping plate having ribs and slotted ears, said ribs engaging the feed plate, and means coöperating with the slotted ears for clamping the supporting ring in axial alinement with a cylinder to be rebored.

4. In a machine for reboring engine cylinders, a supporting ring, means for clamping the supporting ring in axial alinement with a cylinder to be rebored, an internally threaded feed nut, a feed screw threaded through the nut and having a reduced threaded extension, and a cutter head formed with a threaded bore to receive the extension, the head being formed with a reduced portion having angular faces and with a sleeve portion beyond the reduced portion and movable into and out of the threaded bore of the nut whereby the cutter head may be drawn into close proximity to the nut.

5. In a machine for reboring engine cylinders, a supporting ring, means for clamping the supporting ring in axial alinement with an engine cylinder to be rebored, a feed nut carried by the supporting ring, a cutter head, cutter blades adjustable in the head, the head being formed with a threaded bore, a blade adjusting member threaded in the bore and having a shank extending through and beyond the nut for ready adjustment, and a feed screw threaded through the nut and having threaded engagement in the bore of the cutter head and formed with a socket to seat the shank.

6. In an engine reboring machine, a supporting ring, means for clamping the supporting ring in axial alinement with a cylinder to be rebored, a split resilient centering ring adapted to seat partially within the supporting ring and to project below the same, a feed nut carried by the supporting ring, a feed screw threaded through the nut, a cutter head, a beveled head secured to the cutter head, and means for connecting the beveled head to the extended end of the feed screw.

7. In an engine reboring machine, a supporting ring, means for clamping the supporting ring in axial alinement with a cylinder to be rebored, a split resilient centering ring adapted to seat partially within the supporting ring and to project below the same, a feed nut carried by the supporting ring, a feed screw threaded through the nut, a cutter head, a beveled head secured to the cutter head, means for connecting the beveled head to the extended end of the feed screw, and a split expansible guide ring carried by the beveled head to engage the wall of the cylinder.

8. In an engine reboring machine, a supporting ring, means for clamping the supporting ring in axial alinement with a cylinder to be rebored, a split resilient centering ring adapted to seat partially within the supporting ring and to project beyond the same, a feed nut carried by the supporting ring, a feed screw threaded through the nut, a cutter head, a beveled head secured to the cutter head, means for connecting the beveled head to the extended end of the feed screw, and a split expansible guide ring carried by the beveled head to engage the wall of the cylinder, the centering ring, guide ring and beveled head being all capable of being drawn into the supporting ring when the cutter head moves into the adjacent end of the cylinder.

9. In a cylinder reboring machine, a clamping plate formed with opposed ears provided with alined slots, one of the ears being formed with an additional slot parallel to the first, and work engaging shoulders formed transversely of the plate and upon each side thereof.

In testimony whereof I affix my signature.

ROBERT E. ROSEBERRY. [L. S.]

Copies of this patent may be obtained for five cents each, by addressing the "Commissioner of Patents, Washington, D. C."